Figure 1:
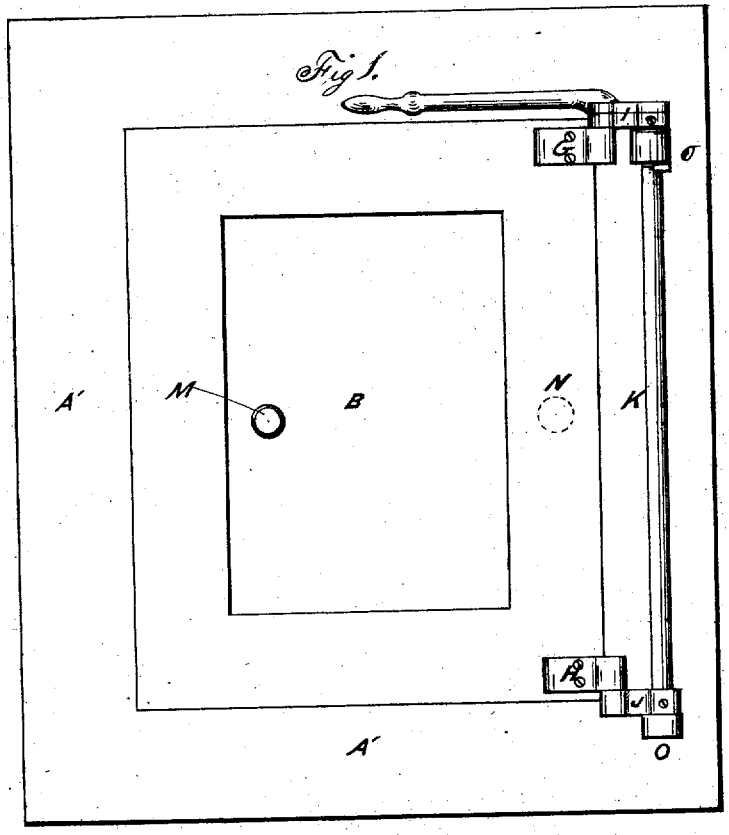

J. FARREL & J. WEIMAR.

SAFES.

No. 7,338. Reissued Oct. 10, 1876.

Witnesses
M. E. H. Smith
J. Emmermann

John Farrel
Jacob Weimar
by Earle H. Smith
Attorney.

N. PETERS, PHOTO-LITHOGRAPHER, WASHINGTON, D. C.

UNITED STATES PATENT OFFICE.

JOHN FARREL AND JACOB WEIMAR, OF NEW YORK, N. Y.

IMPROVEMENT IN SAFES.

Specification forming part of Letters Patent No. 101,245, dated March 29, 1870; reissue No. 7,338, dated October 10, 1876; application filed May 2, 1874.

*To all whom it may concern:*

Be it known that we, JOHN FARREL and JACOB WEIMAR, of the city, county, and State of New York, have invented certain Improvements in Safes; and the following is a description thereof, reference being had to the accompanying drawing, which forms part of this specification.

Our improvements relate to a class of safes known as "burglar-proof," by which is meant safes provided with defenses against forcible entry thereof with the tools and appliances ordinarily used by burglars; and they consist in certain combinations of mechanical instrumentalities or devices, substantially as hereinafter set forth.

The first of our said combinations is composed of elastic packing and double tongues and grooves in the seam or joint around the door of a step-flanged burglar-proof safe-door and jamb, the effect of which combination is to utilize the tongues and grooves commonly used as a protection against wedging, for the purpose of enhancing the efficiency of the packing as a preventive to the introduction of explosives through the seam, and to secure the utility of such packing, as herein set forth.

The second of our combinations is composed of a packing and double interlocking tongues and grooves, with a door swung on hinges or hinge-connections susceptible of allowing two motions of the door in opening and closing—one the ordinary swinging motion, and the other to engage and disengage the door with and from the jamb—in which combination it is practicable to surround the door on every side with the combined packing and tongues and grooves.

The third combination is composed of the safe-door, hinges susceptible of allowing two motions of the door, as aforesaid, a lever or leverage, substantially such as hereinafter specified, and a bar or rod arranged for operation in connection therewith, substantially as hereinafter set forth, by which means the door is made to obey motion and force applied thereto by the leverage at the upper and lower edges simultaneously.

The fourth combination is composed of the lever or leverage, safe-door, two-motion hinges, and the packing in the seam between the safe-door and jamb.

The fifth combination is composed of the lever or leverage, two-motion hinges, and tongue-and-grooved safe-door and jamb.

The sixth combination is composed of the lever or leverage, two-motion hinges, packing, and tongue-and-grooved safe-door and jamb.

The seventh combination is composed of the lever or leverage, the two-motion hinges, and means for holding the front side or edge of the door close against the packing.

Figure 2:
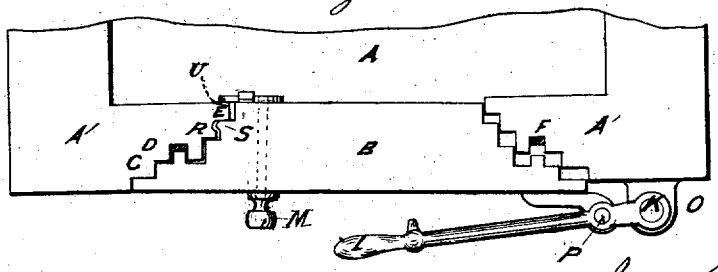

In the annexed drawing, Figure 1 is a front elevation of the door and door-frame of a burglar-proof safe or vault. Fig. 2 is a sectional view, showing the lever from above.

A is the body of the safe. A′ is the door frame and jamb, and B is the door. The door and jamb have several offsets or flanges, C D E; the sides whereof are perpendicular, or thereabout, to the front of the safe.

In the face of one of the inner steps or flanges constituting the jamb of the door-frame there is a groove, having its sides at right angles, or nearly so, with the face of the door; and on the inner face of a like flange or step of the door there is a corresponding tongue.

Within the seam around the door, between the door and jamb, is placed a gasket or packing, F, of india-rubber or other elastic substance; the function whereof is to fill the joint where located, and prevent the introduction of fine gunpowder, nitro-glycerine, or other explosive through the seam.

The said tongue on the door and groove in the jamb are arranged in the seam or joint remote from its outer edges, leaving one or more steps intervening as protection, and results in a tongue on the jamb and groove in the door, forming a double tongue and groove, which, when the door is closed, become mutually interlocked with each other.

Such interlocked tongue and groove, heretofore used to resist any wedging operation at the seam around the door, we make use of to preserve the utility and efficacy of the packing, which, in the event of the door being wedged away from the jamb, as might be done if there were no tongue and groove, would be lost. They also intercept the advantagewedges, or the like, driven in the seam with the view of so opening it, and the step-flanges serve a similar purpose.

The efficiency of the packing as a preventive of the introduction of explosive agents is enhanced by compression in a groove by a corresponding tongue, which enters the groove on closing the door, and is forced against or into the packing. The tongue also conceals and protects the packing from injury by any instrument possibly forced into the seam with that view.

The tongues and grooves are formed on both the front and rear sides of the door and jamb, as well as at the top and bottom. The door would not, therefore, open and close readily if hung on ordinary hinges, in the usual manner. Moreover, when the door is so hinged there is some uncertainty of making a tight joint with the packing at the rear near the hinges. We therefore adopt a method of hanging the door wherein such door is attached to the door-frame by hinge-connections, which we term "two motion," meaning thereby hinges allowing an out and in motion of the hinged side of the door, (additional to and independent of its ordinary swinging motion,) for engaging and disengaging the door with and from the jamb preparatory to swinging it open and in finally closing it, and which additional motion may also be described as transverse to the turning axis of the hinges.

In illustration of a door so hung, G H represent hinge-leaves affixed to the door, carrying pivots or pintles P, which are received in the short cranks I J, pivoted to ears O on the door-frame. In the ordinary motion the door swings on pivots or pintles in the more usual way. In the additional motion the hinge-leaves G H, in which are the pintles P, move out or in with the door, in lines nearly parallel with the sides of the tongues and grooves.

To facilitate the application of force to move the door, and to compress the packing on finally closing it, we make use of a leverage in connection with the two-motion hinges, and such leverage is of advantage in this connection for tongue-and-grooved doors, particularly if heavy or close-fitting, with or without the packing. This part of the invention is illustrated by the lever L I, through which manual power applied at the long or free end, L, is augmented (at P) where received by the door. This leverage is obtained by extending one of the cranks I or J beyond the pintle P sufficiently to gain the required power; or, instead of so extending one of the said cranks, a lever may be attached thereto. Such lever is a fixture with a device, K, which is a bar or shaft mounted in bearings near the hinges, and enables the operator, by means of the forcing-lever, to act with power on the door at or near both the upper and lower hinges at once, and for this purpose is connected with the door by mechanism as at P I and P J. Through this arrangement the augmented power exerted by the lever on the door moves the upper and lower edges of the door simultaneously.

It is desirable to have a means of fastening at the front side of the door to hold the door closed before locking, and particularly during the operation thereon of the leverage in connection with the two-motion hinges. Such a fastening is represented by a small finger, Q, fixed at the inner end of a spindle, on the outer end of which is a knob, M. When the knob is turned, after pushing in the front side of the door, the finger Q is caused to ride up on a beveled or cam surface, U, on the inside of the door-frame, and so draw the door inward.

Another fastening consists of a bead or projection, S, on the side of one of the front flanges, received in a corresponding recess in the jamb as the door is closed.

We claim in a burglar-proof safe—

1. The combination of elastic packing and double tongues and grooves in the seam between the door and jamb, for the purposes specified.

2. The combination of the packing and tongues and grooves with a door swung on hinge-connections allowing of two motions, for the purposes specified.

3. The combination, with the safe-door, two-motion hinge-connections, and lever or leverage, of a bar or shaft, K, and mechanism connecting it with the door, for the purposes specified.

4. In combination, the safe-door, the packing, the lever or leverage specified, and two-motion hinge-connections.

5. In combination, the lever or leverage specified, two-motion hinge-connections, and tongue-and-grooved safe-door and jamb.

6. In combination, the lever or leverage specified, two-motion hinge-connections, packing, and tongue-and-grooved safe-door and jamb.

7. The combination, with the safe-door, two-motion hinge-connections, bar or shaft K, and lever or leverage, of means for holding the front edge of the door closed, substantially as set forth.

JOHN FARREL.
JACOB WEIMAR.

Witnesses:
FRANK O. HERRING,
JOHN L. ROBERTS, Jr.